US007967705B2

(12) United States Patent  (10) Patent No.: US 7,967,705 B2
Connerley et al.  (45) Date of Patent: *Jun. 28, 2011

(54) BACKBOARD REPLACEMENT SYSTEM

(75) Inventors: James J. Connerley, Noblesville, IN (US); Marty D. Retter, Alexandria, IN (US)

(73) Assignee: Gared Holdings, LLC, Noblesville, IN (US)

( * ) Notice: Subject to any disclaimer, the term of this patent is extended or adjusted under 35 U.S.C. 154(b) by 169 days.

This patent is subject to a terminal disclaimer.

(21) Appl. No.: 12/351,557

(22) Filed: Jan. 9, 2009

(65) Prior Publication Data

US 2009/0158572 A1  Jun. 25, 2009

Related U.S. Application Data

(63) Continuation-in-part of application No. 11/960,142, filed on Dec. 19, 2007, now Pat. No. 7,794,342.

(51) Int. Cl.
*A63B 63/08* (2006.01)
(52) U.S. Cl. ........................................ 473/481; 473/479
(58) Field of Classification Search .......... 473/479–486; 403/353, 377; 108/152; 414/11, 4; 224/509; 248/222.51; 29/426.1
See application file for complete search history.

(56) References Cited

U.S. PATENT DOCUMENTS

| | | | | |
|---|---|---|---|---|
| 1,522,957 A | | 1/1925 | Kennedy | |
| 2,447,150 A | * | 8/1948 | Andersen | 414/723 |
| 2,939,590 A | * | 6/1960 | Henry | 414/11 |
| 3,305,219 A | * | 2/1967 | Rhodes | 414/11 |
| 3,339,273 A | * | 9/1967 | Knosp | 483/8 |
| 3,540,753 A | | 11/1970 | Hanson | 280/47.34 |
| 3,891,237 A | | 6/1975 | Allen | 280/477 |
| 3,970,304 A | * | 7/1976 | Ebstein et al. | 473/481 |
| 3,985,249 A | | 10/1976 | Aker et al. | 214/145 |
| 4,225,265 A | | 9/1980 | Hooker et al. | 403/353 |
| 4,480,578 A | | 11/1984 | Fisher et al. | 114/344 |

(Continued)

FOREIGN PATENT DOCUMENTS

DE  9410510.3  2/2004

(Continued)

OTHER PUBLICATIONS

Webpage download—Dec. 2, 2010,peterson,2007,www.peterson-mfg.com/fabmaster/roll%20rak%20flyer.pdf,5 pages.*

(Continued)

*Primary Examiner* — Gene Kim
*Assistant Examiner* — Mike Chambers
(74) *Attorney, Agent, or Firm* — Brinks Hofer Gilson & Lione

(57) ABSTRACT

A storage cart for supporting a backboard assembly during replacement and storage is provided, which may also be used in combination with a quick change coupling system to permit the quick removal and replacement of the backboard assembly. The storage cart can include a frame, a carrier unit and a lifting mechanism. The frame includes a base, a top, and upright support members interconnecting the base and top. The base depth can be greater than the top depth to form a taper, permitting a backboard assembly to lean against the frame. The carrier unit includes a shelf sized to support the backboard assembly. The lifting mechanism includes means for adjusting the vertical position of the shelf to (dis)engage the shelf with the backboard assembly. The storage cart can include wheels, where the storage cart can be easily moved through a standard sized door and into its suitable position.

25 Claims, 14 Drawing Sheets

U.S. PATENT DOCUMENTS

| | | | | |
|---|---|---|---|---|
| 4,587,716 A | * | 5/1986 | Bytow | 483/14 |
| 4,588,188 A | | 5/1986 | Mahoney et al. | 273/1.5 R |
| 4,613,135 A | | 9/1986 | Rush | 273/1.5 R |
| 4,747,612 A | | 5/1988 | Kuhn | 280/460 A |
| 4,854,812 A | | 8/1989 | Smith et al. | 414/723 |
| 4,884,938 A | * | 12/1989 | Fujita et al. | 414/541 |
| 5,022,649 A | | 6/1991 | Traub et al. | 273/1.5 R |
| 5,067,742 A | | 11/1991 | Relja | 280/479.2 |
| 5,303,857 A | | 4/1994 | Hewson | 224/42.03 B |
| 5,308,059 A | | 5/1994 | Owen, Jr. et al. | 273/1.5 R |
| 5,480,139 A | | 1/1996 | Owen, Jr. et al. | 273/1.5 R |
| 5,584,635 A | * | 12/1996 | Stapelmann | 414/11 |
| 5,647,604 A | | 7/1997 | Russell | 280/492 |
| 5,779,569 A | | 7/1998 | Townsend et al. | 473/433 |
| 5,947,848 A | | 9/1999 | Koole | 473/483 |
| 7,794,342 B2 | * | 9/2010 | Connerley et al. | 473/481 |
| 2001/0054596 A1 | * | 12/2001 | Ward | 211/85.5 |
| 2009/0163305 A1 | | 6/2009 | Connerley et al. | 473/481 |

FOREIGN PATENT DOCUMENTS

| | | |
|---|---|---|
| DE | 202005014934 U1 | 3/2006 |
| EP | 0689984 A1 | 1/1996 |

OTHER PUBLICATIONS

European Search Report, dated Mar. 31, 2010, pp. 1-6, European Patent Application No. 10075007.4—1260, European Patent Office, The Netherlands.

* cited by examiner

BACKBOARD REPLACEMENT SYSTEM

CROSS-REFERENCE TO RELATED APPLICATIONS

This application is a continuation-in-part of U.S. application Ser. No. 11/960,142, entitled "QUICK CHANGE BACKBOARD BRACKET SYSTEM," filed Dec. 19, 2007, now U.S. Pat. No. 7,794,342 herein incorporated by reference in its entirety.

BACKGROUND

1. Technical Field

This invention relates to basketball goals generally consisting of a backboard assembly, a basketball goal support assembly, and a storage cart used to facilitate replacement of the backboard assembly. More particularly, the present invention relates to a system for replacing the backboard assembly using the storage cart.

2. Background Information

The game of basketball is popular throughout the world. Part of its popularity may stem from the simplicity of equipment used, i.e., at least one elevated basket and a ball. More commonly, the equipment is at least one basketball goal, which includes a backboard, a rim assembly, a basketball goal support, and a basketball. Additionally, its popularity may stem from the fact that basketball can be played outdoors and indoors, which lends itself to be played year round.

Notwithstanding, basketball goals are known to deteriorate, break, or even become dated. For example, a basketball player can exert enough force and torque on a basketball goal to distort permanently the rim assembly, shatter the backboard, or even break the basketball goal support mechanism. When this occurs, especially to the backboard and/or the rim assembly, the game, practice, or recreation of basketball must be stopped to permit facilities personnel to replace the old basketball goal with a new basketball goal. For movable basketball goal systems, regardless of what is in need of repair, the broken basketball goal is generally moved away on its wheels and replaced with a new basketball goal that is moved in and fixed to the floor. Yet, the cost and expense of having one or more replacement basketball goals in storage can be great in terms of equipment and inventory space.

Alternatively, if only the backboard and/or rim assembly is in need of repair, it would be advantageous to only replace what is needed without moving the entire basketball goal and to do so quickly. Depending on the number of fasteners and couplings that engage the basketball goal to the basketball goal support, the time to replace the basketball goal can last for about twenty minutes to about one hour or more. During this hiatus, players can cool off, spectators can lose interest, and the total time for the game can be extended for an unreasonable period of time.

Various basketball goals have been conceived to allow for a quicker replacement. Many involve only the rim assembly, and many of these involve only rim assemblies for the outdoors. Here, the rim assemblies generally include a rim and a mounting plate. The mounting plate would then attach via a fastener or shaft to a receiving plate that is attached to the backboard. Typically, the rim assemblies for the outdoors are more inexpensive and lesser in quality than the rim assemblies for the indoors. The rim assemblies for the indoors, including gymnasiums and arenas, are generally "commercial grade" because of the construction and materials used to account for the amount of use and mobility of basketball goals. Because of this higher quality, indoor basketball goals are more typically replaced with a whole new basketball goal system, instead of replacing the part on the spot.

Accordingly, there remains a need for a basketball goal to be quickly replaced. In particular, there remains a need to replace the backboard and rim assembly on the spot during a timeout (a few minutes) or during a halftime (about twenty minutes). Furthermore, there remains a need to replace the backboard and rim assembly on the spot without having to replace the entire basketball goal. There is additionally a need for a cart that will facilitate both the storage and replacement of a backboard and rim assembly.

BRIEF SUMMARY

The shortcomings of the prior art are addressed generally by a basketball goal that can include one or more couplings that permit the quick change and replacement with another backboard assembly. The one or more couplings can also permit, during normal use and impact, the rim to be maintained at its conventional position and effective rigidity. Particularly, the basketball goal may include a quick change backboard bracket system. The quick change backboard bracket system can include a backboard, a first yoke member, a rim assembly, a second yoke member, bracing means for coupling the backboard to a basketball goal support, or any combination. The backboard can have a peripheral frame with a bracket. The first yoke member can include a central plate coupled to the backboard and a left web and a right web fixed to the central plate. The left and right webs can extend rearward and each web may have a slot, an opening, or both. The rim assembly can be coupled to the central plate of the first yoke member through the backboard. The second yoke member can include a middle plate coupled to a basketball goal support, a left arm and a right arm fixed to the middle plate, a coupling shaft, and a connecting pin. The left and right arms can extend frontward and each arm may have a first aperture and a second aperture. The coupling shaft can be dimensioned to fit within, and positioned through, each first aperture. Additionally, the coupling shaft can be dimensioned to engage the slot of the first yoke member. The connecting pin can be dimensioned to engage each opening of the first yoke member and each second aperture of the second yoke member. A bracing means can couple the backboard to the basketball goal support and a rim assembly can be coupled to the central plate of the first yoke member through the backboard.

The quick change backboard bracket system described above can be used with a storage cart, which can support the backboard and rim assembly when being (de)coupled to the basketball goal support. Alternatively, the storage cart can be used with other basketball goal systems, where the backboard and rim assembly are removed for storage and/or maintenance. The storage cart can include a frame that has a base, a top, and a plurality of upright support members interconnecting the base and the top. The frame may also include means for moving the frame, such as a plurality of wheels. The means for moving the frame permits the storage cart to move from a storage place to the basketball goal assembly, and back to the storage place. The frame can also be easily rotated to allow each side of the frame to be used for storing the backboard and rim assembly. The base can have a depth that is greater than a depth of the top to form a taper. The taper is sized to permit the backboard to lean securably against the frame. The storage cart can also include a carrier unit and a lifting mechanism. The lifting mechanism, attached to the frame and to the carrier unit, is configured to adjust the vertical position of a shelf.

The carrier unit, which is attached to the frame, can include the shelf sized to support the backboard. The storage cart can also include a second shelf positioned at the opposite side of the frame as the shelf. The second shelf can be vertically adjusted, and a pin-in-hole coupling can be used to couple the second shelf to the frame. Alternatively, the storage cart may be configured to include one or more carrier units on more than one side of the storage cart, or one or more second shelf configurations on more than one side.

In one example, the carrier unit can include at least one pair of cross members positioned at lateral sides of the frame, with each cross member having a first end pivotably connected to the frame and a second end attached to the shelf. The pair of cross members can be an upper pair and a lower pair. In one aspect, the carrier unit can further include at least one lateral member connecting at least one pair of cross members positioned at opposite lateral sides of the frame. In another aspect, the carrier unit may further include a pair of upright members and a top member. Each upright member can attach to the second end of the cross members of the upper and the lower pairs to define a lateral edge of the carrier unit to permit each cross member to pivot about the respective second end. The top member, attached to an upper portion of each upright member, can extend laterally beyond the lateral sides of the frame. The top member may include arms at the ends that can be configured to prevent lateral movement of the backboard when placed on the shelf. The shelf can be attached to a lower portion of each upright member of the carrier unit. The lifting mechanism is configured to urge each cross member to pivot about the first end to adjust the vertical position of the second end and the shelf. The lifting mechanism may include a lift jack and a manual crank connected to the lift jack, where the manual crank can be rotated to adjust the vertical position of a movable member of the lift jack.

In another example, the carrier unit can include at least one pair of sleeve members positioned at lateral sides of the frame. Each sleeve member can have an outer portion connected to the lifting mechanism and engaged with the shelf. Each sleeve may also have an inner portion slidably engaged with the frame. The lifting mechanism can urge each sleeve member to slide against the frame to adjust the vertical position of each sleeve member and the shelf. In one aspect, the lifting mechanism can include a threaded shaft having one end attached to the carrier unit and a free end, and a manual crank connected to the lifting mechanism having a portion configured to rotate the threaded shaft. The manual crank can be rotated to adjust the vertical position of threaded shaft.

For the purposes of promoting an understanding of the principles of the invention, reference will now be made to the embodiments illustrated in the drawings, and specific language will be used to describe the same. It should nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

DETAILED DESCRIPTION OF THE DRAWINGS AND THE PRESENTLY PREFERRED EMBODIMENTS

Figure 1:
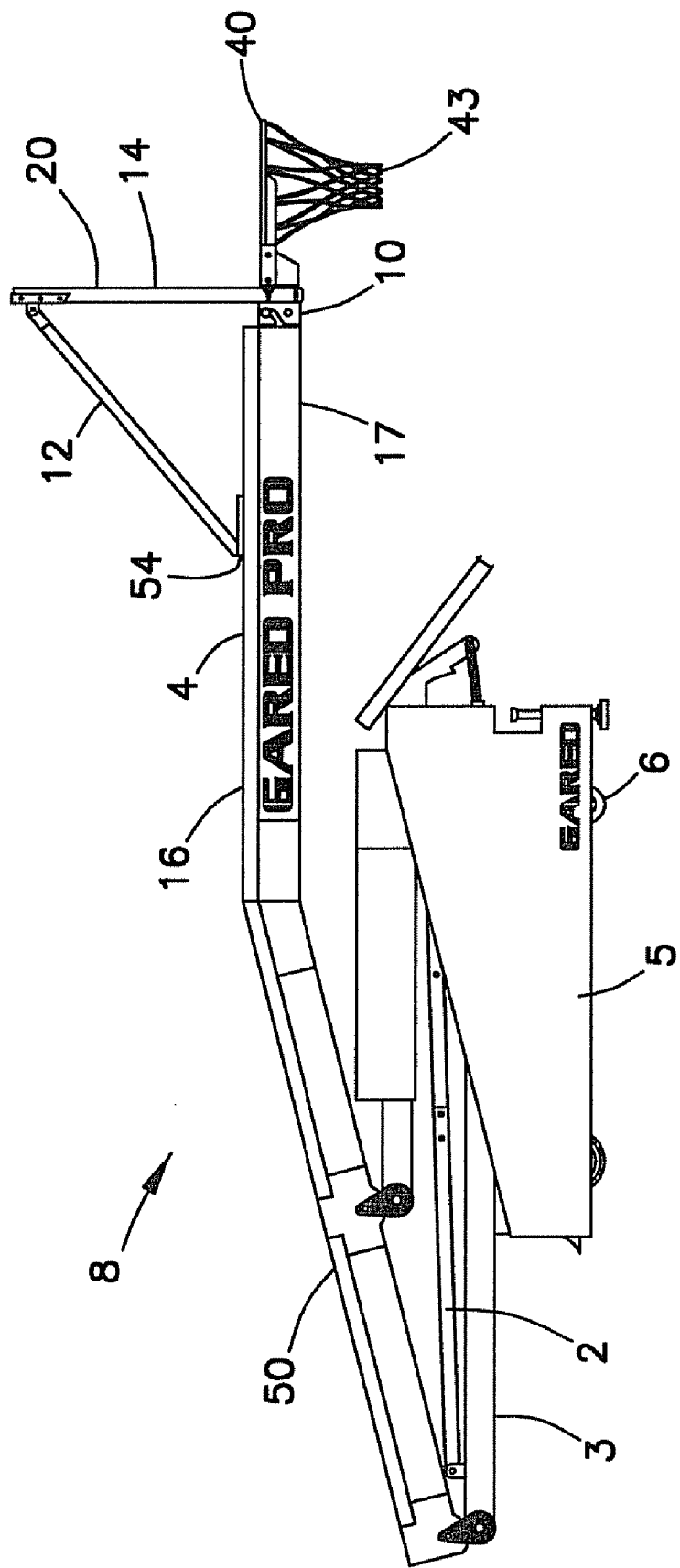
FIG. 1 is a side view of a basketball goal.
Figure 2:
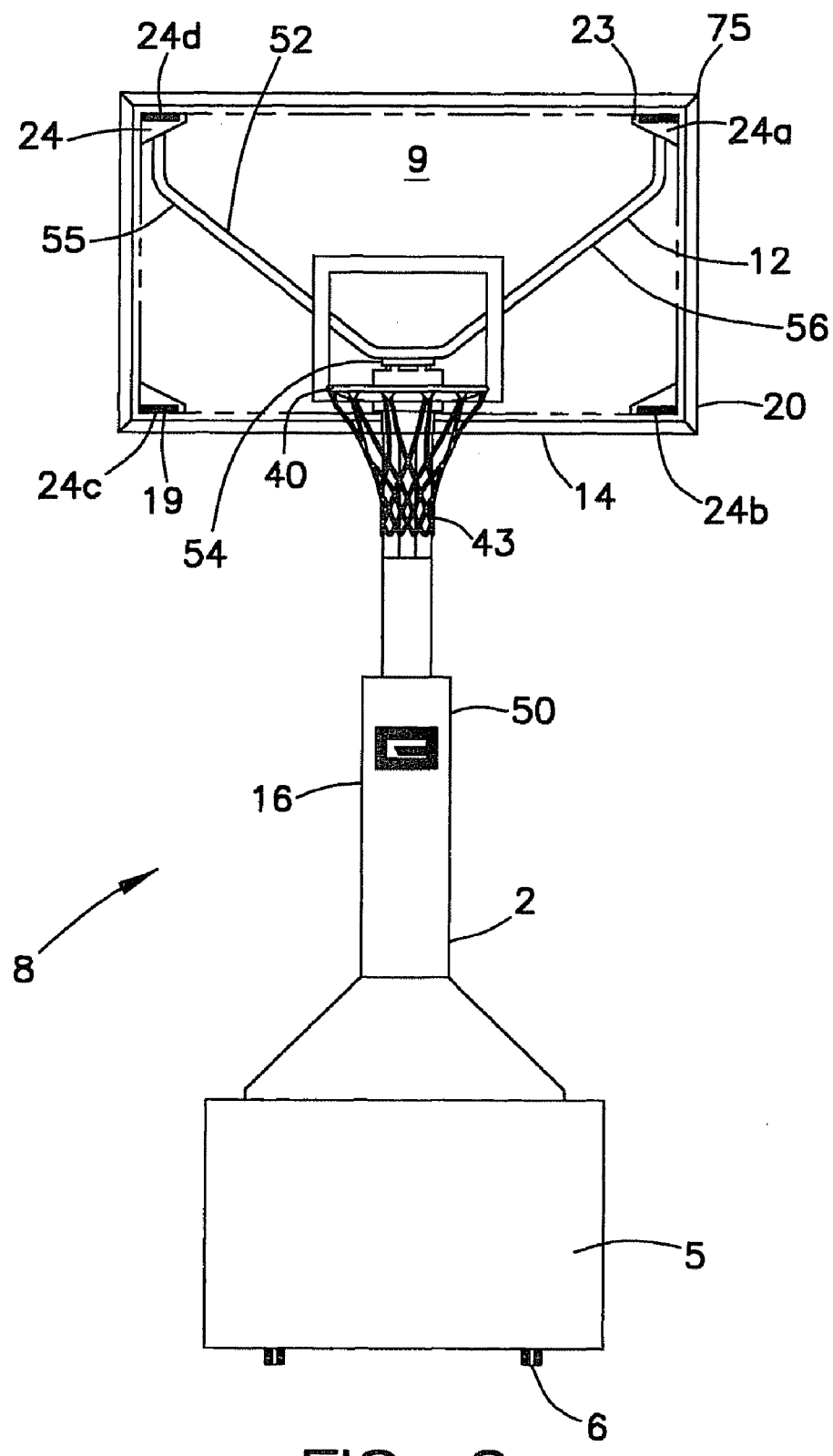
FIG. 2 is a front view of the basketball goal.
Figure 3A:
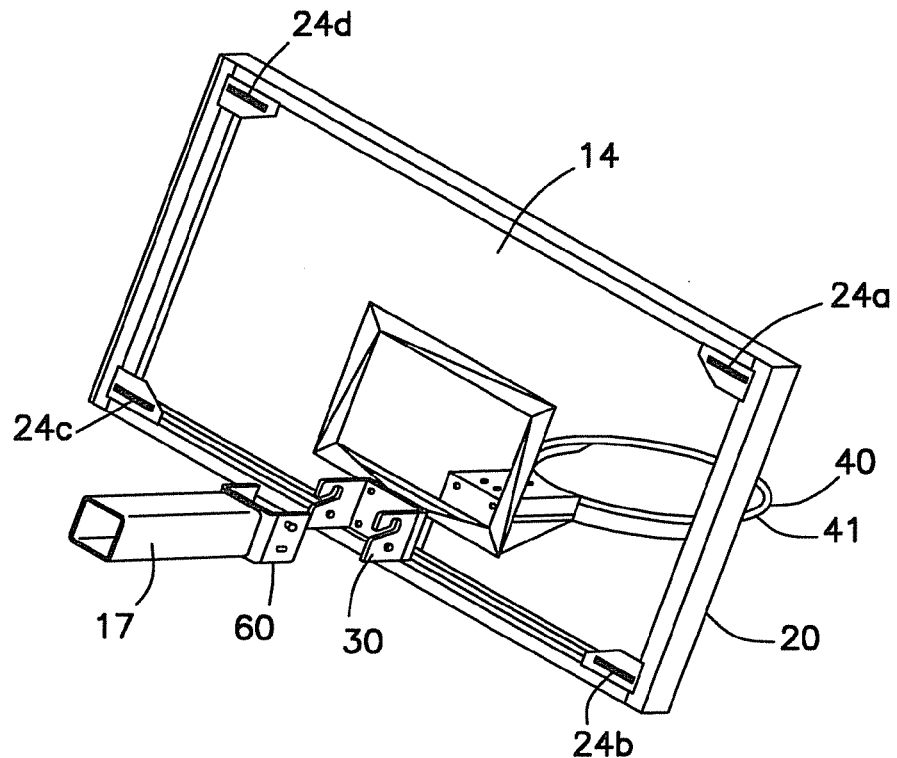
FIG. 3a is a rear perspective view of a backboard assembly including a rim assembly and a first and second yoke member of one embodiment of the invention.

FIGS. 1 and 2 shows a side view and a front view a basketball goal system 8 including an illustrative quick change backboard bracket system 10 having a backboard assembly 14 coupled to a basketball goal support assembly 16. The backboard assembly 14 can include a backboard 20, a rim assembly 40, and a first yoke member 30, as shown in FIG. 3a. The basketball goal support assembly 16 can include a second yoke member 60, bracing means 12 coupled on the upper portion 9 of the backboard 20 to support the basketball goal support assembly 16, and a basketball goal support 50. The basketball goal system 8 can be stationary or can be a mobile system. An illustrative basketball goal system 8 is a GARED Pro 5017 Portable Basketball Goal System shown in FIGS. 1 and 2. The GARED Pro 5017 Portable Basketball Goal System includes a hydraulic portable backstop 2 for lowering and raising the system, a decreasing trapezoidal extension arm 4 for stability to the backboard 20 and the rim assembly 40, regulation glass competition backboard 20, the rim assembly 40 having a breakaway goal, a base 5, and a plurality of wheels 6 for rolling and maneuvering the system. For example, one regulation glass competition backboard 20 is made of a fully tempered glass with a aluminum frame surrounding the glass, with the backboard 20 having a general dimension of about 1.2 m×1.8 m (48 inches×72 inches) and weighing about 100 kg (220 pounds).

The quick change backboard bracket system 10 can allow for a quick and easy removal and replacement of the backboard assembly 14. The various components of the quick change backboard bracket system 10 are dimensioned to have tolerances to ensure that the basketball goal system as assembled has the desired stability in the case of a dunk shot or a player hanging on the rim. Furthermore, it is desired that no special tools be required for replacing the backboard assembly 14.

The backboard 20 of the backboard assembly 14 has a peripheral frame 22 as shown in FIG. 2. Preferably, the backboard 20 is rectangular; however, the backboard 20 can be any shape known by one of ordinary skill in the art. The backboard 20 can be made of glass or other transparent materials or composites, while the peripheral frame 22 can be made in any metal known in the art, such as steel, aluminum or the like. The backboard 20 can also have apertures, not shown, that allow fasteners 46 to run through it.

The backboard 20 can further include at least one bracket 23 that can couple to a bracing member 52. One embodiment of the backboard 20 and the bracket 23 is shown in FIG. 2. Here, the brackets 23 are corner brackets 24; that is, four corner brackets with one corner bracket 24a being in the upper-right portion of the backboard 20, one corner bracket 24b being in the lower-right portion of the backboard 20, one corner bracket 24c being in the lower-left portion of the backboard 20, and one corner bracket 24d being in the upper-left portion of the backboard 20. The corner brackets 24 may be a corner gusset which may have a slot or opening 19 for engaging the bracing member 52.

The bracing means 12 may have a single bracing member 52. Other embodiments of the bracing means 12 may have two or more bracing members 52. The bracing member 52 can have a basketball goal support coupling 54 on a connecting arm portion 17 of the basketball goal support assembly. The basketball goal support coupling 54 may be used to couple the backboard 20 to the basketball goal support 50. In addition, the bracing means 12 can comprise at least one or more supporting members 55, preferably two supporting members 55, 56. One embodiment of the bracing means 12 is two supporting members 55, 56, shown in FIG. 2. Here, the two supporting members 55, 56 extend vertically and frontward toward the backboard 20 to couple to the two corner brackets 24a, 24d of the upper portion 9 of the backboard 20 with a pin and hairpin clip retainer 75.

Figure 3B:
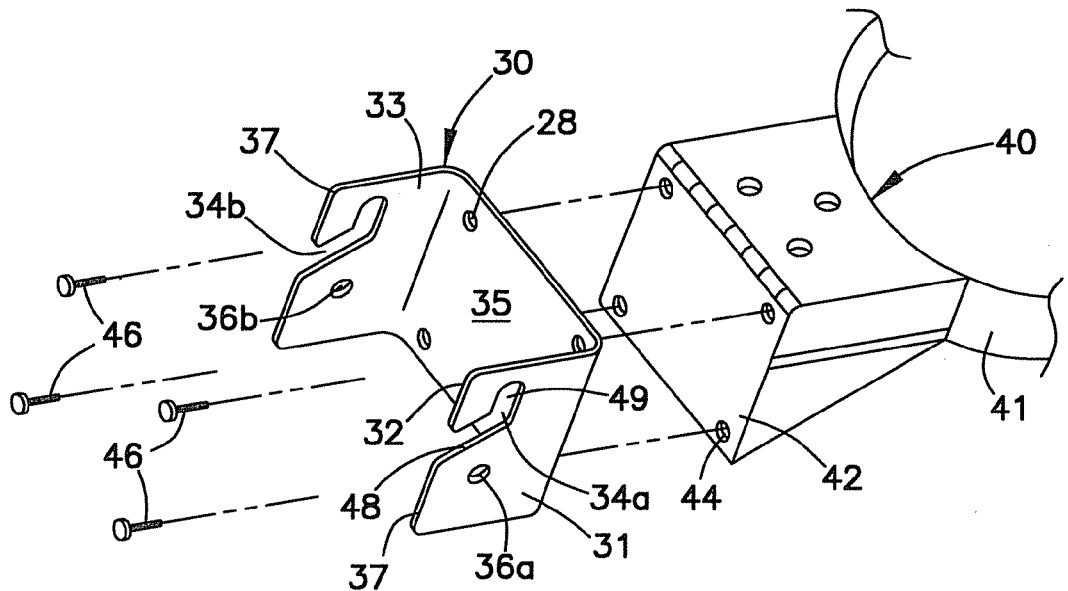
FIG. 3b is a rear perspective view of a rim assembly and a first yoke member of one embodiment of the invention.
Figure 3C:
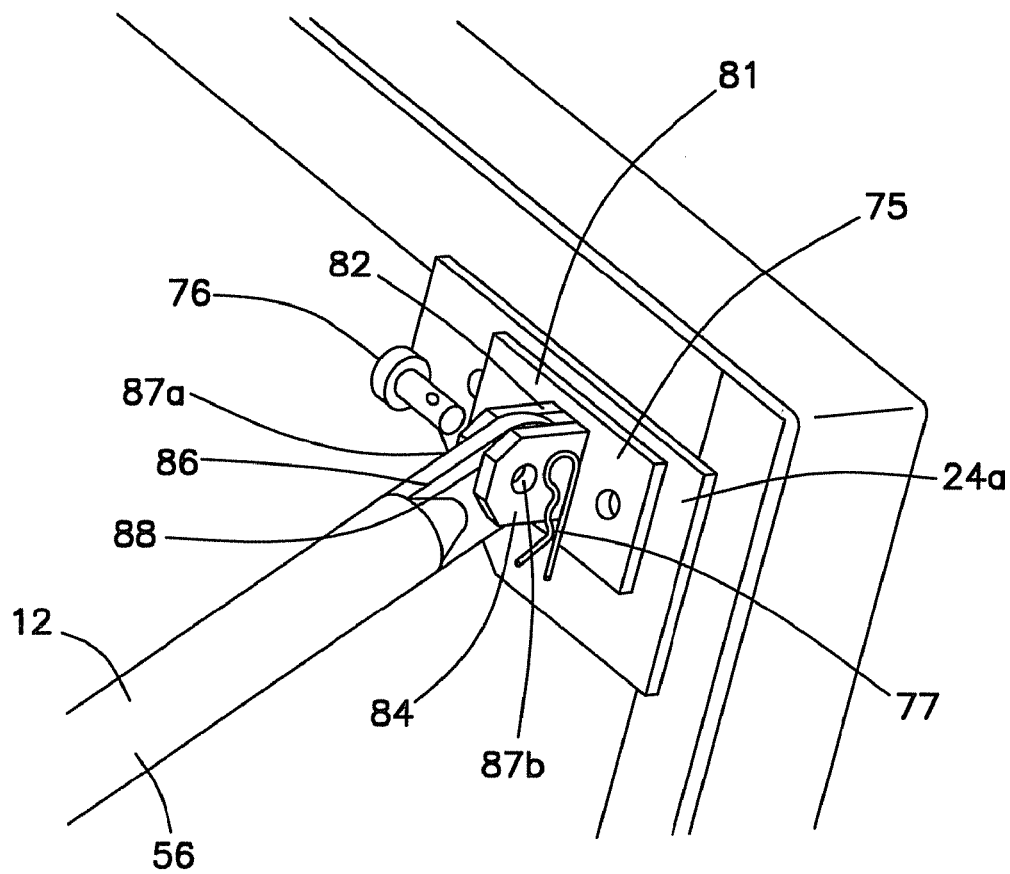
FIG. 3c is a rear perspective detail view of one corner of the backboard showing a coupling between a corner bracket and a bracing member.

In FIG. 3c, the pin and hairpin clip retainer 75 preferably includes a supporting plate 81 fixed to each corner bracket 24. The supporting plate 81 has two vertically-oriented members 82, 84 extending away from the backboard 20. The vertically-oriented members 82, 84 are preferably separated by distance that is substantially the same or slightly greater than the lateral distance of an adjoining member 86 from the supporting members 55, 56 of the bracing means 12. The two vertically-oriented members 82, 84 also have an opening 87a, 87b that are axially align with a similar opening 88 in the adjoining member 86. It is through these openings 87a, 87b, 88, when the adjoining member 86 is positioned between the supporting members 55, 56, that a pin 76 is inserted therethrough. After the pin 76 is inserted, the hairpin clip 77 is affixed to the pin 76 to secure that portion of the backboard 20.

Figure 4:
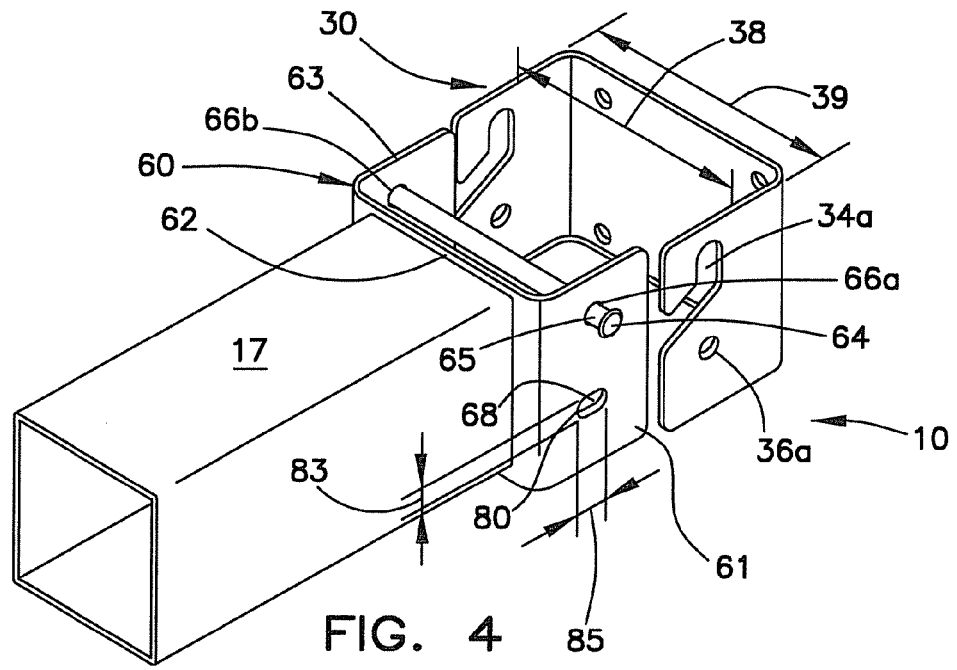
FIG. 4 is a rear perspective view of the first yoke member decoupled from a second yoke member of another embodiment of the invention.
Figure 5:
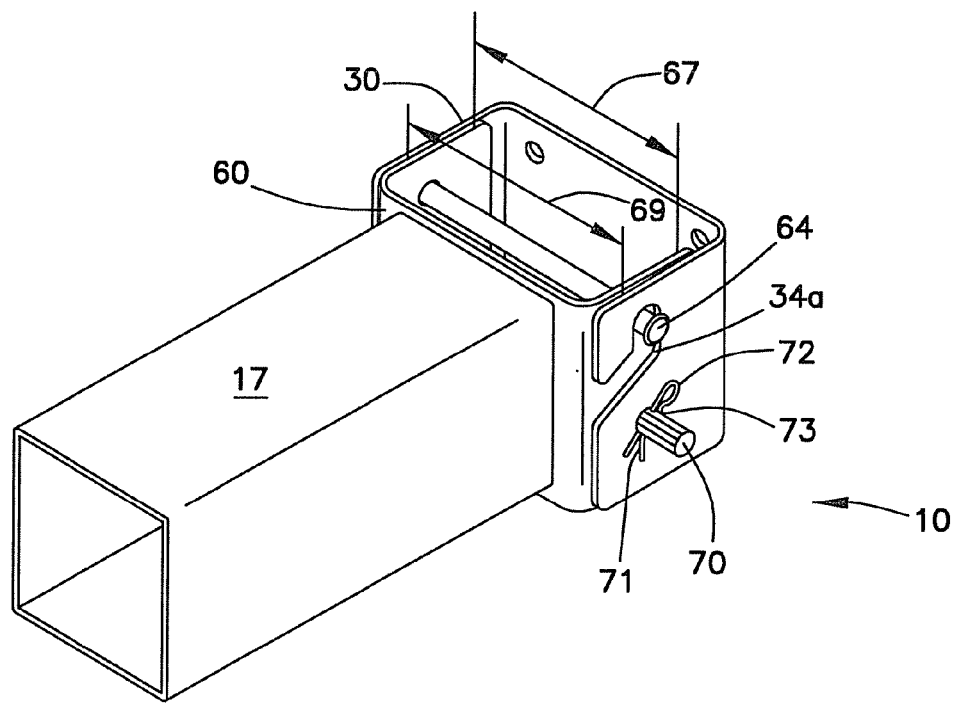
FIG. 5 is a rear perspective view of the first yoke member coupled to a second yoke member of the embodiment in FIG. 4.

Referring to FIGS. 3-5, the first yoke member 30 can include a central plate 32. One embodiment of the first yoke member 30 is shown in FIG. 3a and in more detail in FIG. 3b. Here, the central plate 32 can have apertures 28. The apertures 28 can be for receiving fasteners 46, which pass through the mounting plate 42, backboard 20, and central plate 32. The first yoke member 30 can also include a left web 31 and a right web 33 fixed to the central plate 32. The left and right webs 31, 33 can extend rearward away from the backboard 20 in the vertical position, perpendicular to the backboard 20.

Figure 6A:
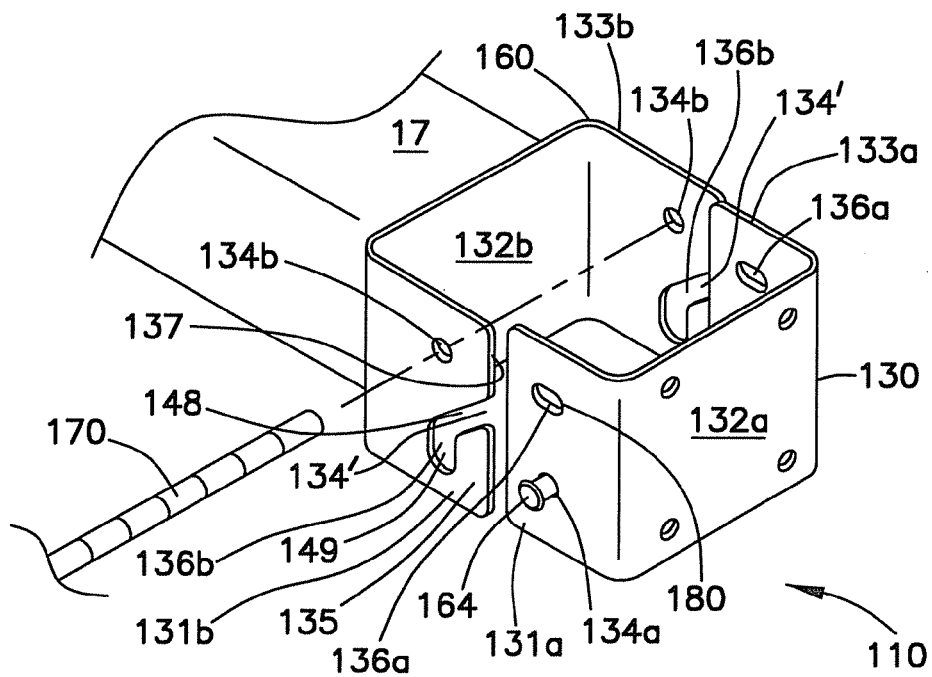
FIG. 6a is a front perspective view of a first yoke member decoupled from a second yoke member of an alternative embodiment of the invention.

Each web 31, 33 can have a slot 34a, 34b, at least one opening 36a, 36b, or both. Each slot 34a, 34b can have one direction or can be multi-directional. Preferably, each slot 34a, 34b in FIG. 3b is bi-directional, with one portion 48 of the slot having a direction that is frontward and upwardly diagonal and with another portion 49 of the slot 34a, 34b having a direction that is upward or vertical and parallel to the backboard 20. In another example, as shown in FIG. 6a, the open ended slot 134' is bi-directional, with one portion 148 of the slot having a direction that is rearward and/or downwardly diagonal and with another portion 149 of the slot 134' having a direction that is downward or vertical and parallel to the backboard. Alternatively, each slot 34a, 34b can have only one direction that is upward, only one direction that is frontward or horizontal, or any other direction. Additionally, each slot 34a, 34b can be created from the top side, from the bottom side, from the front side, or from the rear side of each web 31, 33. Preferably, each slot 34a, 34b is created at the upper portion 35 and from the rear side 37 of each web 31, 33 as shown in FIG. 3b. Alternatively, in FIG. 6a each slot 134' is created at the lower portion 135 and from the front side 137 of each web 131a, 131b, 133a, or 133b. Each slot 34a, 34b can be dimensioned to receive a coupling shaft 64, as shown in FIG. 4. Furthermore, each slot 34a, 34b can be axially aligned or can be positioned on each web 31, 33 so that each slot 34a, 34b is in mirror symmetry. Similarly, each opening 36a, 36b can be dimensioned to receive a connecting pin 70, shown in FIG. 5. Each opening 36a, 36b can be axially aligned, can be positioned on each web 31, 33, so that each slot 34a, 34b is in mirror symmetry, or both.

Referring to FIG. 3b, the rim assembly 40 can include the mounting plate 42. The mounting plate 42 can have apertures 44 for receiving the fastener 46. For example, four apertures 44 with four fasteners 46 are shown in FIG. 3b. It is desired that the apertures 44 of the mounting plate 42, the apertures (not shown) of the backboard 20, and the apertures 28 of the central plate 32 have a common longitudinal axis and be aligned. Fasteners 46 can be used to run through all these apertures to secure the mounting plate 42 to the back surface of the backboard 20, the backboard 20, and central plate 32 to the front surface of the backboard 20. Any suitable fastener known in the art can be used, such as screws, bolts, or rivets. Preferably, the number of fasteners 46 should be the same as the number of apertures 46. The rim 41 is mounted so that the rim is in the conventional horizontal position. A net 43, as shown in FIGS. 1 and 2, can be suspended from the rim 41 in the usual manner.

The quick change backboard bracket system 10 may also include the second yoke member 60, with one embodiment shown in FIG. 4. The second yoke member 60 can include a middle plate 62. The middle plate 62 of the second yoke member 60 may be coupled to and may extend from the basketball goal support 50 as shown in FIGS. 1 and 2. The second yoke member 60 and the basketball goal support 50 may be one unit. Alternatively, the second yoke member 60 may be a single unit that can be attached to any basketball goal support.

The second yoke member 60 can also include a left arm 61 and a right arm 63, which can be fixed to the middle plate 62. The left and right arms 61, 63 can extend frontward toward the backboard 20 in the vertical position, perpendicular to the backboard 20. Each arm 61, 63 can have a first 66a, 66b and a second aperture 68. Each first aperture 66a, 66b can be dimensioned to receive the coupling shaft 64, as shown in FIG. 4. The coupling shaft 64 can be dimensioned to fit within and positioned through each first aperture 66a, 66b of the second yoke member 60 and to engage each slot 34a, 34b of the first yoke member 30. Means for attaching the coupling shaft 64 to each first aperture 66a, 66b can comprise of welding. Moreover, other means for attaching can include press fitting the coupling shaft 64 within each first aperture 66a, 66b, mechanically expanding the coupling shaft 64 with each first aperture 66a, 66b, or any other means known in the art by one of ordinary skill.

Moreover, each second aperture 68 can be dimensioned to receive the connecting pin 70, as shown in FIG. 5. Though each second aperture 68 can have a circular edge; preferably, each second aperture 68 has an elliptical edge 80 that has a first cross sectional distance 85 in the horizontal direction greater than a second cross sectional distance 83 in the vertical direction, as shown in FIG. 4. Alternatively, the elliptical edge 80 can have the first cross sectional distance 85 that is less than the second cross sectional distance 83. If each second aperture 68 has a circular edge, the second aperture should be slightly larger than the dimension of the opening 36a, 36b of the first yoke member 30. The slightly larger dimensioned second aperture or the elliptical edged second aperture would allow for some small margin in error in manufacturing and assembling when coupling the first yoke member 30 to the second yoke member 60. Furthermore, having one direction of each slot 34a, 34b be perpendicular to the predominant direction 83 or 85 of the elliptical edge 80 of each second aperture 68 can allow for easier assembly.

The connecting pin 70 is dimensioned to engage each opening 36a, 36b of the first yoke member 30. Means 71 for engaging the connecting pin 70 to and from each opening 36a, 36b and each second aperture 68 can include a retainer pin 72, as shown in FIG. 5. Other means 71 for engaging the connecting pin 70 can be a bolt/nut fastener, a bolt and retainer pin fastener, or any other means known by one of ordinary skill in the art. It is desired that whatever means for engaging the connecting pin 70 can also be quickly disengaged. One example is the retainer pin 72, which can be inserted through an opening 73 of the connecting pin 70, around the circumference of the connecting pin 70, or both.

The first yoke member 30 and the second yoke member 60 can be constructed of a metal channel, e.g., a steel channel or iron channel. Alternatively, the first yoke member 30 and the second yoke member 60 can be constructed from multi-metal pieces welded or secured together by any means known by those skilled in the art.

Referring to FIGS. 4 and 5, the arms 61, 63 of the second yoke member 60 can be separated by an outermost lateral distance 69 that is less than an innermost lateral distance 38 of the webs 31, 33 of the first yoke member 30. The coupling shaft 64 may have projecting ends 65 to engage each slot 34a, 34b of the first yoke member 30. The coupling shaft 64 may also have a lateral dimension greater than an outermost lateral distance 39 of the webs 31, 33 of the first yoke member 30. In another embodiment, the webs 31, 33 of the first yoke member 30 can be separated by an outermost lateral distance 39 that is less than an innermost lateral distance 67 of the arms 61, 63 of the second yoke member 60.

Figure 6B:
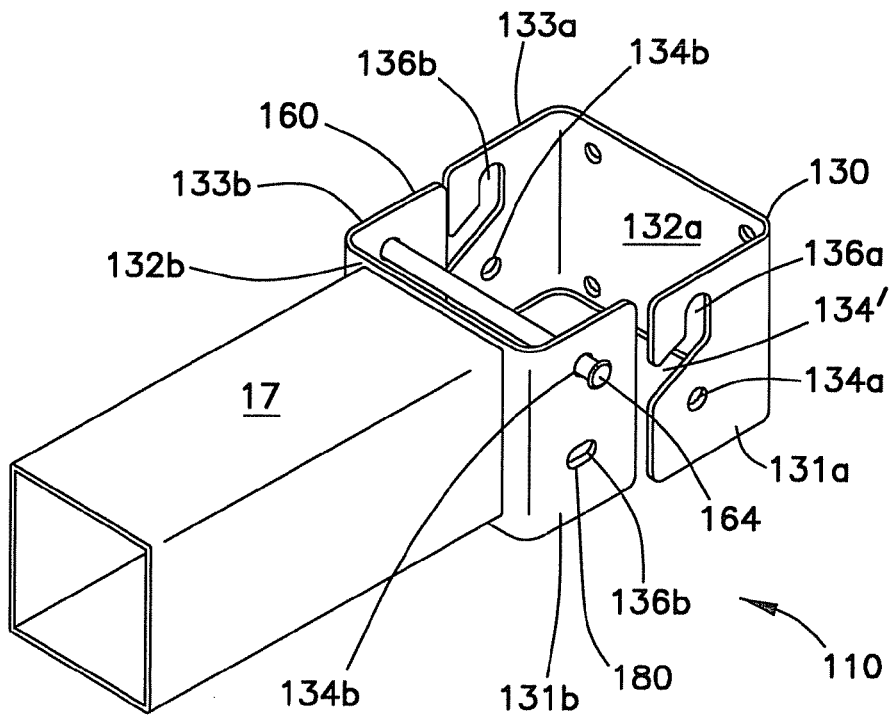
FIG. 6b is a front perspective view of a first yoke member decoupled from a second yoke member of an alternative embodiment of the invention.

In an another embodiment shown in FIGS. 6a and 6b, the quick change backboard bracket system 110 can include an alternative first yoke member 130 and second yoke member 160. The quick change backboard bracket system 110 can include all of the limitations described above. For example, each yoke member 130, 160 can include a central plate 132a, 132b. Each yoke member 130, 160 can also include a left web 131a, 131b and a right web 133a, 133b affixed to the central plate 132a, 132b. The left webs 131a, 131b and right webs 133a, 133b may extend away from the central plate 132a, 132b. Furthermore, the left webs 131a, 131b and right webs 133a, 133b can have a first opening 134a, 134b, a second opening 136a, 136b, or both. Here, the second openings 136a or 136b in the webs 131a, 131b, 133a, 133b of one of the first yoke member 130 and second yoke member 160 can be a closed-ended slot 180. Optionally, the second openings 136a or 136b in the webs 131a, 131b, 133a, 133b of another of the first yoke member 130 and second yoke member 160 can be the open-ended slot 134'.

The central plate 132a of the first yoke member 130 can be coupled through the backboard to a rim assembly, similar to what is shown in FIG. 3a. Referring back to FIGS. 6a and 6b, the left web 131a and the right web 133a of the first yoke member 130 can be mounted in the vertical configuration and can extend away from the backboard. The central plate 132b of the second yoke member 160 can be coupled to a basketball goal support. Each web 131b, 133b of the second yoke member 160 can be mounted in the vertical configuration and can extend toward the backboard.

A coupling shaft 164 can be dimensioned to fit within, and positioned through, each first opening 134a or 134b of one of the first yoke member 130 and second yoke member 160. Also, the coupling shaft 164 can be dimensioned to engage either each second opening 136a or 136b of another of the first yoke member 130 and second yoke member 160, whichever is the opposite of the one yoke member having the first openings engaged to the coupling shaft 164.

A connecting pin 170 can be dimensioned to fit within and to engage to each first opening 134a or 134b of another of the first yoke member 130 and the second yoke member 160, whichever yoke member is opposite to the one that has the first openings engaged to the coupling shaft 164. The connecting pin 170 can also be dimensioned to fit within and to engage each second opening 136a or 136b of one of the first yoke member 130 and the second yoke member 160, whichever yoke member is opposite to the one that has the second openings to be engaged to the coupling shaft 164. This second opening 136a or 136b can have an elliptical edge.

To illustrate, the coupling shaft 164 can be dimensioned to fit within, and positioned through, each first opening 134a of the webs 131a, 133a of the first yoke member 130, as shown in FIG. 6a. Additionally, the coupling shaft 164 can be dimensioned to engage each second opening 136b or open-ended slots 134' of the webs 131b, 133b of the second yoke member 160. Likewise the connecting pin 170 can be dimensioned to fit within and to engage each second opening 136a or closed-ended slots 180 of the webs 131a, 133a of the first yoke member 130 and each first opening 134b of the webs 131b, 133b of the second yoke member 160.

In another embodiment, referring to FIG. 6b, the coupling shaft 164 can be dimensioned to fit within, and is positioned through, each first opening 134b of the webs 131b, 133b of the second yoke member 160. Additionally, the coupling shaft 164 can be dimensioned to engage each second opening 136a or open ended slots 134' of the webs 131a, 133a of the first yoke member 130. Likewise the connecting pin 170 can be dimensioned to fit within and to engage each second opening 136b or closed-ended slot 180 of the webs 131b, 133b of the second yoke member 160 and each first opening 134a of the webs 131a, 133a of the first yoke member 130.

Another embodiment provides a method of replacing a backboard assembly 14 using the quick change backboard bracket system 10 or 110. The method of replacing is better illustrated by the difference in positions of the yoke members between FIG. 4 and FIG. 5. The method can comprise the steps of providing a first backboard assembly 14, as described above, a second backboard assembly, not shown but substantially similar to the first backboard assembly 14, and a basketball goal support assembly 16, as described above. The connecting pin 70 can be disengaged from each opening 36a, 36b of the first backboard assembly 14 and each second aperture 68 of the basketball goal support assembly 16. If the connecting pin 70 includes a retainer pin 72, the retainer pin 72 is removed before the connecting pin 70 is removed from each opening 36a, 36b and each second aperture 68. The bracing member 52 of the basketball goal support assembly 16 can be decoupled from each bracket 23 of the first backboard assembly 14. Each slot 34a, 34b of the first backboard assembly 14 also can be disengaged from the coupling shaft 64 of the basketball goal support assembly 16.

The first backboard assembly 14 can then be removed and set aside and can be replaced with the second backboard assembly. Each slot 34a, 34b of the second backboard assembly can be engaged to the coupling shaft 64 of the basketball goal support assembly 16. The connecting pin 70 can be engaged to each opening 36a, 36b of the second backboard assembly and each second aperture 68 of the basketball goal support assembly 16. The bracing member 52 of the basketball goal support assembly 16 can be coupled to each bracket 23 of the second backboard. Preferably, these steps in combination with the quick change backboard bracket system can be completed quickly. For instance, the steps may be capable of completion during a timeout or halftime.

Figure 7:
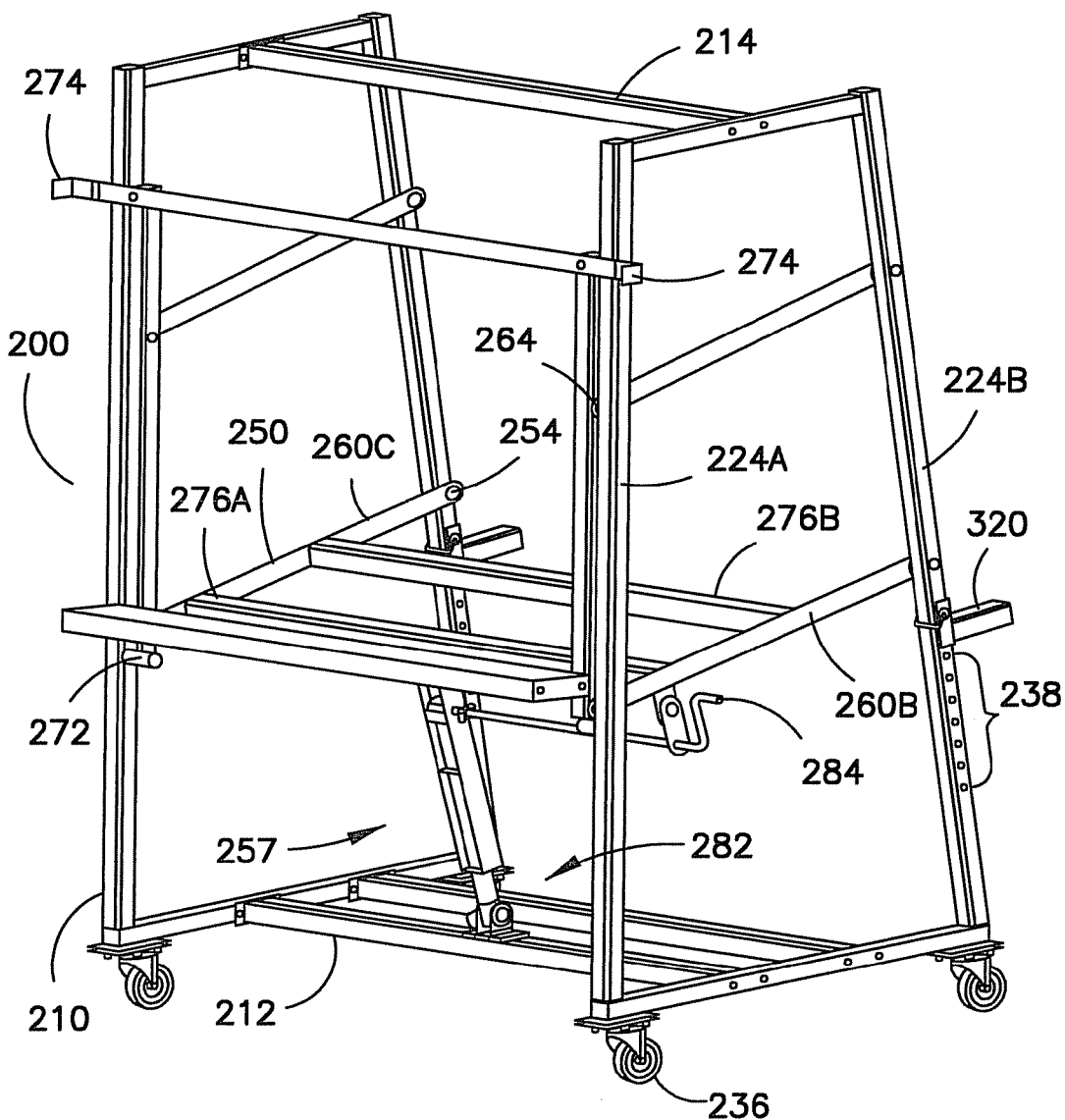
FIG. 7 is a perspective view of a storage cart.
Figure 8:
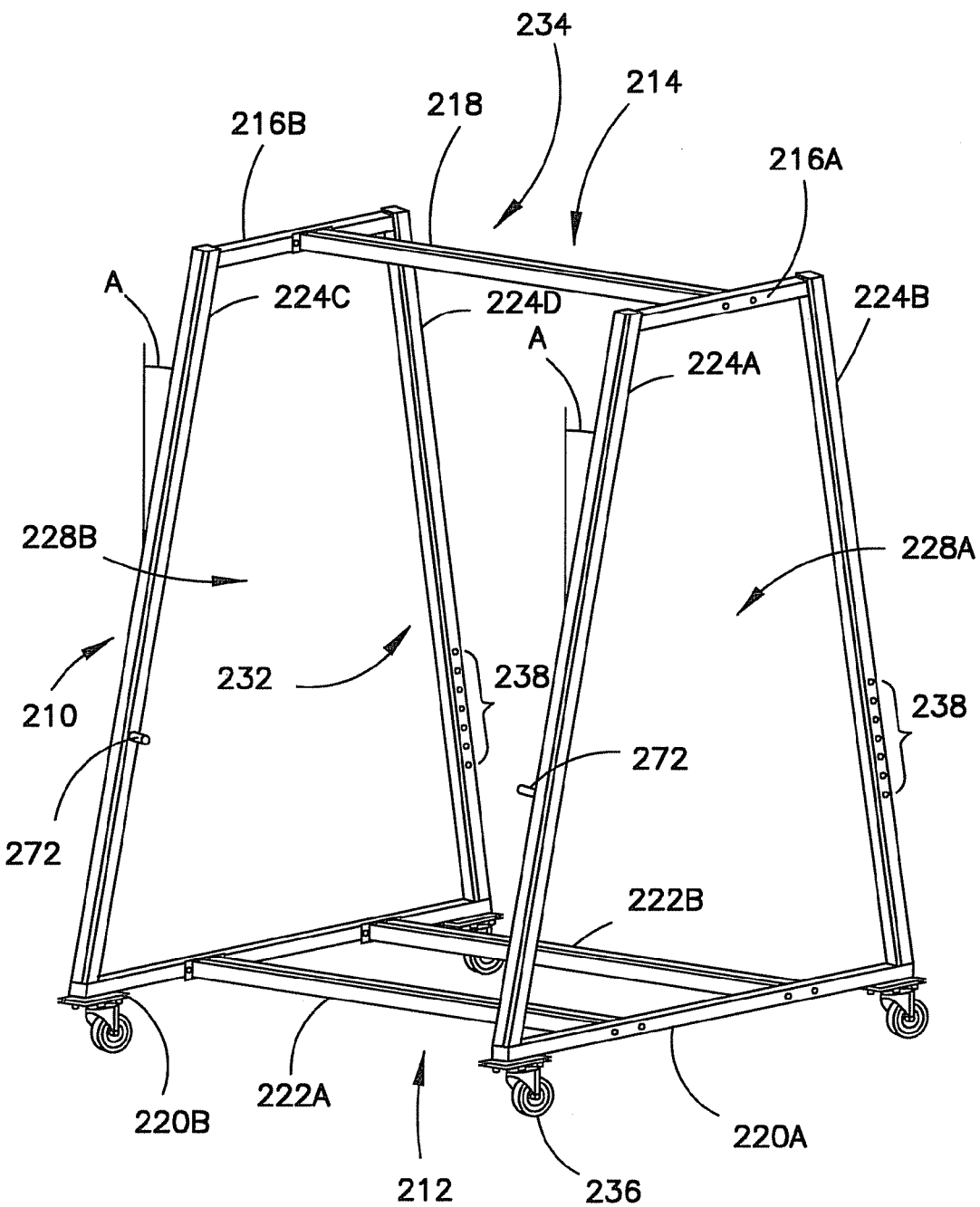
FIG. 8 is a perspective view of a frame of the storage cart in FIG. 7.

FIG. 7 illustrates a storage cart 200 for supporting the first backboard assembly 14 and used to facilitate replacement of the first backboard assembly 14. With reference to FIG. 8, the storage cart 200 can include a frame 210 having a base 212 and a top 214. The base 212 and the top 214 shown in the Figures include one or more first lateral members attached to one or more first cross members. For example, the top 214 in FIG. 8 includes a left and a right first cross member 216A, 216B and one first lateral member 218 attached to approximately the center of the left and right first cross members 216A, 216B. Also in FIG. 8, the base 212 includes a left and a right first cross member 220A, 220B and two first lateral members 222A, 222B attached to the left and right first cross members 220A, 220B.

The base 212 and the top 214 can be interconnected by one or more first upright members. For example, the base 212 and the top 214 are interconnected by four first upright members 224A-D. One pair of the first upright members 224A, 224B define a lateral side 228A of the frame 210, while another pair of the first upright members 224C, 224D define another lateral side 228B of the frame 210. The ends of the first upright members 224A-D attach to the respective ends of the first cross members 216A, 216B, 220A, 220B of the top 214 and the base 212 to form the lateral sides 228A, 228B. One pair of the first upright members 224A, 224C define a front side 232 of the frame 210, while another pair of the first upright members 224B, 224D define a rear side 234 of the frame 210. The base 212 can have a depth that is greater than a depth of the top 214 to form a taper sized to permit the backboard assembly 14 to lean securably against the frame 210. The taper can be on at least one of the front side 232, the rear side 234, and the lateral sides 228A, 228B at an angle A of about 3 degrees to about 20 degrees, and preferably 5 degrees, from vertical. As a result, the front side 232, the rear side 234, or both may be angled toward the center of the frame 210.

Attached to the base 212 of the frame 210 can be means for moving the storage cart 200 proximate the basketball goal support assembly 16. The means for moving can comprise a plurality of wheels 236. For example, a wheel 236 can be attached at the four discrete corners of the base 212 of the frame 210, as shown in FIG. 7. The first upright members 224A-D can include a plurality of holes 238 incrementally spaced. The spacing of the holes 238 of one first upright member 224B can correspond to the spacing of the holes 238 of another first upright member 224D in order for an attachment to be equally adjusted and level. Preferably, the holes 238 of each of the first upright members 224A-D are equally spaced and aligned. The frame 210 is preferably constructed of metal square tubing. However, the frame 210 can be constructed of other materials and in other shapes such as channel, rectangle, angle, round, solid or hollow (tube) suitable to support the weight of one or more backboard assemblies. The material selected may be painted and labeled. Each members of the frame 210 can be attached through welding or the like and/or fasteners such as rivets or nut/bolts. The storage cart 200 can be sized to fit within a height of a standard door of about 2.03 m (80 inches) and within a width of about 0.91 m, (36 inches) or more. The size of the storage cart 200 can be modified for larger entry ways, for example, for a total width of standard double doors of about 1.5 m (60 inches) or more. The storage cart 200 can support one or more backboard assemblies weighing as much as 100 kg (220 pounds). Thus, to support two backboard assemblies the storage cart 200 can support about 200 kg (440 pounds).

In FIG. 7, a carrier unit 250 can be provided to support the backboard assembly 14 and move generally in vertical position, relative to the stationary basketball goal assembly 16, in order to facilitate the removal or replacement of the backboard assembly 14. The carrier unit 250 can include a shelf 252 that is configured to support the backboard assembly 14. A first portion 254 of the carrier unit 250 may be attached to the frame 210, while a second portion 256 may be attached to a lifting mechanism 257.

Figure 9A:
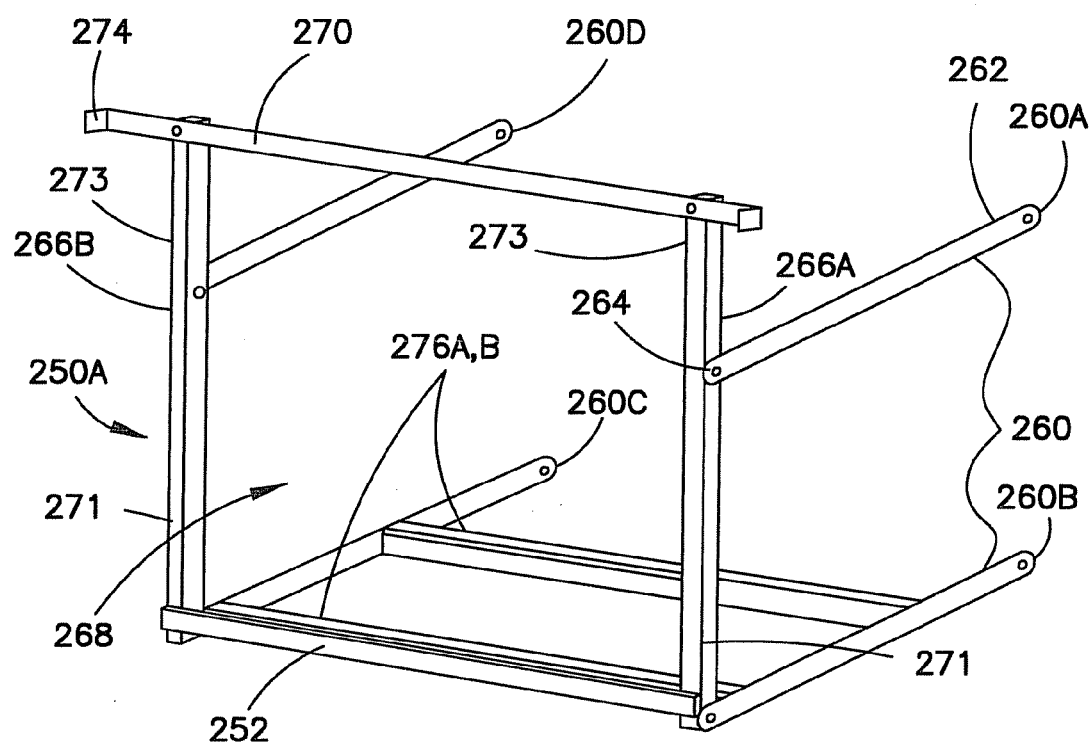
FIG. 9a is a perspective view of a carrier unit of the storage cart in FIG. 7.

One embodiment of the carrier unit 250 is illustrated in FIG. 9a, which shows the carrier unit 250A having an upper pair of second cross members 260A, 260D and a lower pair of second cross members 260B, 260C which can be positioned adjacent to the lateral sides 228A, 228B of the frame 210. Each second cross member 260A-D includes a first end 262 pivotably connected to interior sides of the respective first upright members of the frame 210. Each second cross member 260A-D also has a second end 264 that may be attached to the shelf 252. Optionally, the second end 264 of each second cross member 260A-D may be attached to a pair of second upright members 266A, 266B to define a front side 268 of the carrier unit 250A. The second end 264 is shown to be interposed between the interior side of the first upright member 224A and the exterior side of the second upright member 266A, as shown in FIG. 7.

Figure 9B:
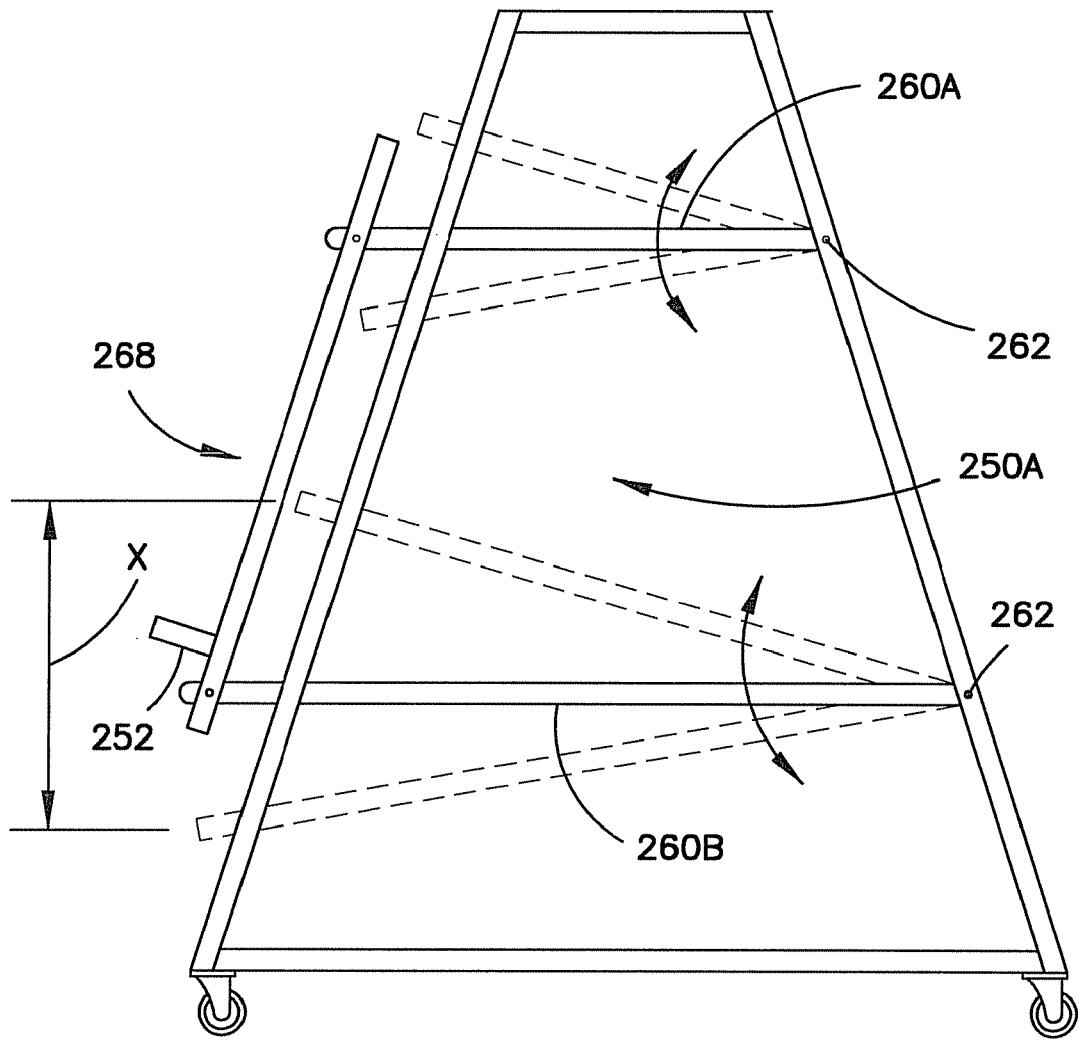
FIG. 9b is a side view of the carrier unit of FIG. 9a depicting the pivotable motion of the carrier unit.

Referring to FIG. 9b, each second cross member 260A-D can pivot about the respective second end 262, as represented by the arrows, in order for the carrier unit 250A to swing at a large radius of curvature. The shelf 252 can attach to a lower portion 271 of the second upright members 266A. Each second cross member can be raised and lower between an upper and a lower extreme, as shown by the dashed lines in FIG. 9b. In one non-limiting example, the total distance X of vertical adjustment of the shelf 252 between the upper and lower extremes is about 14 inches, as shown in FIG. 9b, although distance X may vary suitably to a distance as determined by one ordinary skilled in the art. Although a gap between the upright members and the face of the storage cart may exist, permitting the second cross members to extend past the face of the storage cart as shown in FIG. 9b, preferably, the gap does not exist and the upright members align with the face of the storage cart as shown in FIG. 7. A physical stop 272 may be attached to the interior side of the first upright members 224A, 224C, as shown in FIG. 7. The physical stop 272 functions as rest for the shelf 252 and/or carrier unit 250A when loaded with the backboard assembly 14.

A top member 270 can attach to an upper portion 273 of each second upright member 266A, 266B. The top member 270 may extend laterally beyond the lateral sides 228A, 228B of the frame 210, and may include arms 274 at the end of the top member 270 configured to prevent lateral movement of the backboard assembly 14. The arms 274 can be configured as L-shaped (FIG. 9a), with one leg extending out to prevent lateral movement and another leg creating a separation between the backboard assembly 14 and the frame 210 to prevent scratching and/or fracturing of the backboard. Another configuration of the arms 274 can include C-shaped, with one leg to prevent lateral movement, one leg to prevent outward movement, and another leg creating a separation between the backboard assembly 14 and the frame 210 to prevent scratching and/or fracturing of the backboard. Padding or a soft material can be affixed to the arms 274 to cushion the backboard assembly 14. The arms 274 can be permanently affixed to the top member 270, removably attached with a set screw, or rotated or pivoted to reorient the legs of the arms 274. Clamps, ropes, tape, wire, adjustable locking straps, or the like may also be used for additional security and stability of the backboard assembly 14 to the frame 210.

The carrier unit 250A may also include one or more second lateral members connecting the second cross members positioned at opposite lateral sides of the frame. FIG. 7 illustrates the ends of two second lateral members 276A, 276B attaching to the interior facing side of the second cross members 260B, 260C. At least one of the second lateral members 276A, 276B may attach to one portion of the lifting mechanism 257.

According to FIG. 7, the lifting mechanism 257 can be used to urge each second cross member 260A-D to pivot about the first end 262, thereby adjusting the vertical position of the second end 264 and/or the shelf 252. The lifting mechanism 257 can be configured to adjust the vertical position of the shelf 252 to engage or disengage the shelf 252 with the backboard assembly 14. In one embodiment, the lifting mechanism 257 can include a lift jack 282. A manual crank 284 can be connected to the lift jack 282, and the manual crank 284 can be rotated to adjust the vertical position of a movable member of the lift jack 282. Optionally, the lift jack 282 may be connected to electrical and/or hydraulic components that allow the lift jack to be operated with a controller. Alternatively, the shelf 252 can be used on at least one of the front side 232, the rear side 234, and the lateral sides 228A, 228B. It is appreciated that one of ordinary skill in the art could include the carrier unit 250A with the lifting mechanism 257 on at least one of the front side 232, the rear side 234, and the lateral sides 228A, 228B.

Figure 9C:
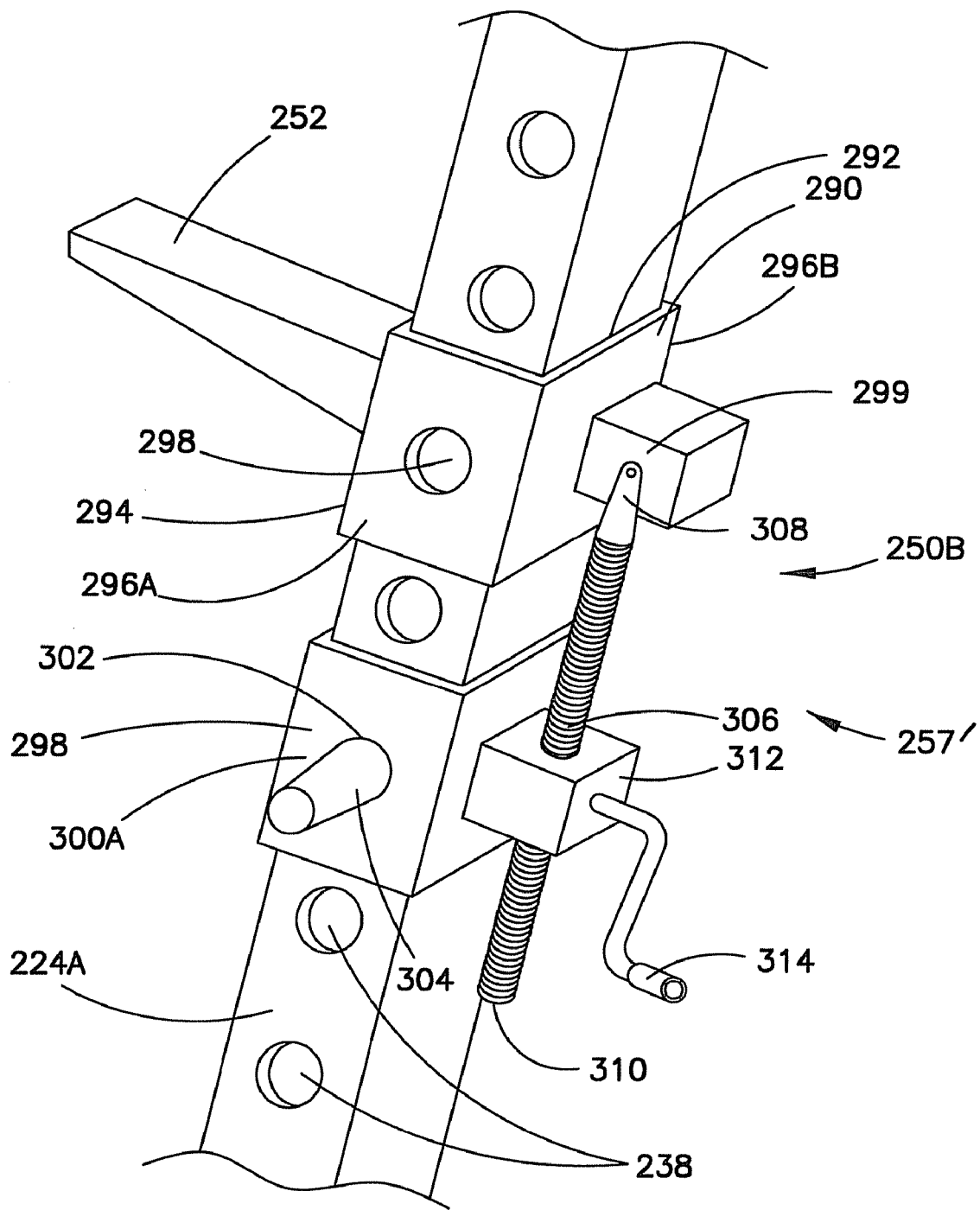
FIG. 9c is a perspective view of another carrier unit coupled to the frame of the storage cart.

In another embodiment of the carrier unit 250, shown in FIG. 9c, the carrier unit 250B includes at least one pair of sleeve members 290 positioned at the exemplary first upright members 224A of the frame 210. In addition, other embodiments can have the carrier unit 250B positioned at the first upright members 224B, 224D. The sleeve members 290 have an inner portion 292 slidably engaged with the first upright member 224A of the frame 210. For example, when the frame 210 is constructed of square tubing, the sleeve member 290 can also be constructed of square tubing have an interior cross-sectional area slightly larger than the exterior cross-sectional area of the first upright member 224A, in order for the sleeve member 290 to fit around the first upright member 224A. One side 294 of the sleeve member 290 includes the shelf 252' or a support member for the shelf 252'. One side 296A, or two sides 296A, 296B oppositely disposed, can include a hole 298 extending through the wall of the sleeve member 290. Through this hole(s) 298, a pin (not shown) having a cross-sectional area slightly less than the hole(s) 298 is inserted therethrough in order for the pin to slide through the hole(s) 298 and into the aligned hole(s) 238 of the first upright member 224A of the frame 210. The pin can lock the sleeve member 290 into place to prevent the sleeve member 290 from sliding. The sleeve member 290 also can have an outer portion 299 extending outward to attach to a portion of the lifting mechanism 257'.

According to FIG. 9c, the lifting mechanism 257' urges each sleeve member 290 to slide against the first upright member 224A of the frame 210, adjusting the vertical position of each sleeve member 290 and/or the shelf 252'. The lifting mechanism 257' can include a slidable base 298, which may be constructed similarly to the sleeve member 290. For example, one side 300A, or two sides oppositely disposed, of the slidable base 298 can include a hole 302 extending through the wall of the slidable base 298. Through this hole(s) 302, a pin 304 having a cross-sectional area slightly less than the hole(s) 302 is inserted therethrough in order for the pin 304 to slide through the hole(s) 302 and into the aligned hole(s) 238 of the first upright member 224A of the frame 210. The pin 304 can lock the slidable base 298 into place to prevent the slidable base 298 from sliding.

The lifting mechanism 257' can include a threaded shaft 306 having one end 308 attached to a portion 299 of the sleeve member 290 and a free end 310. The threaded rod 306 extends through a rod and crank transmission 312, where a manual crank 314 is attached. The manual crank 314 has a portion configured to rotate the threaded shaft 306, allowing the manual crank 314 to be rotated to adjust the vertical position of threaded shaft 306. By rotating the manual crank 314, the vertical position of the threaded rod 306 can be adjusted, thereby adjusting the vertical position of the sleeve member 290. It is appreciated that one of ordinary skill in the art could include the carrier unit 250B with the lifting mechanism 257' on at least one of the front side 232, the rear side 234, and the lateral sides 228A, 228B.

Figure 10:
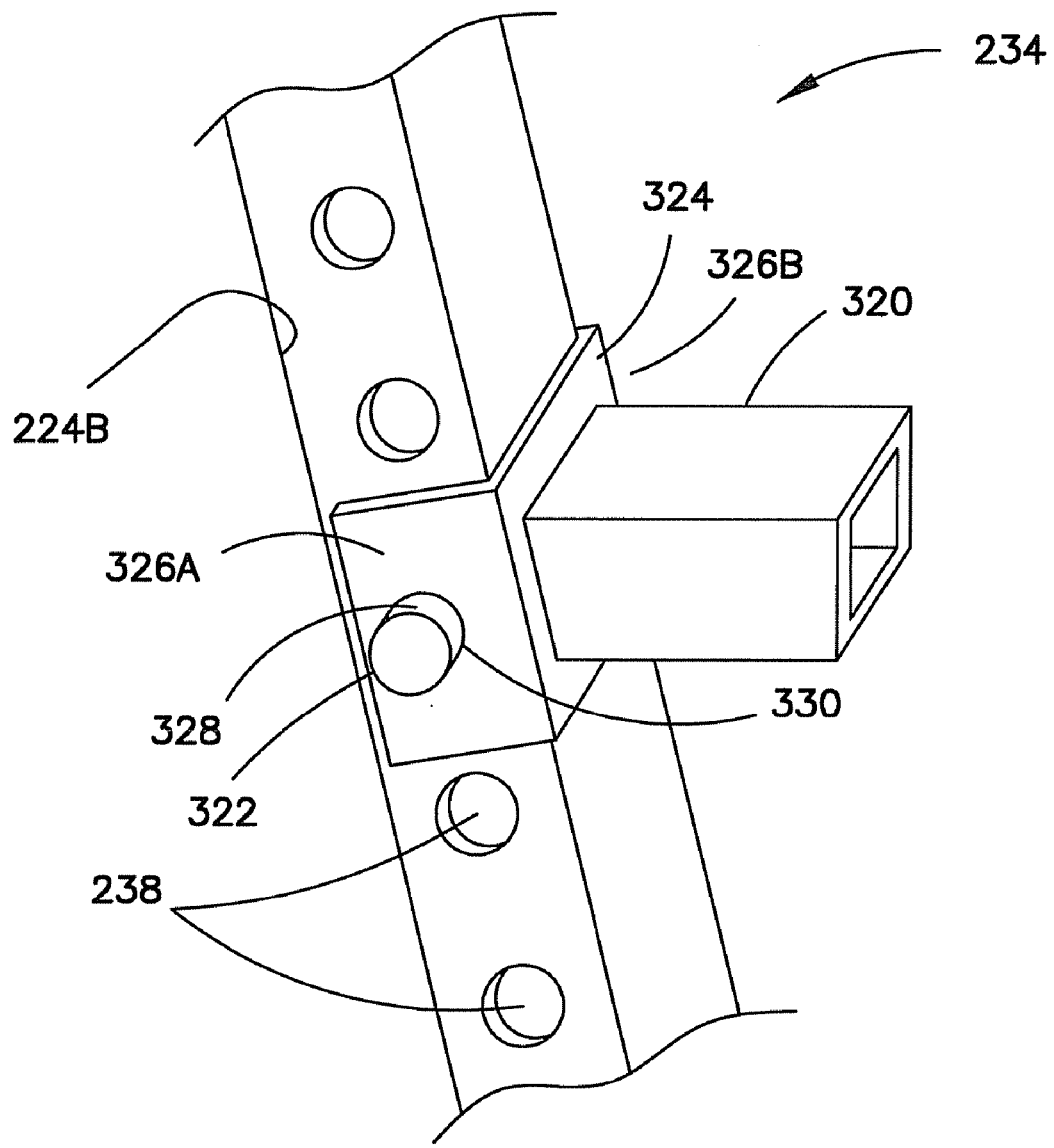
FIG. 10 is a perspective view a second shelf coupled to the frame of the storage cart.

In FIGS. 7 and 10, the cart 200 can also include a second shelf 320 positioned at the opposite side of the frame 210. For example, one embodiment of the shelf 252 or 252' can be positioned along the front side of the frame while another embodiment of the shelf 320 can be positioned along the rear side of the frame. The second shelf 320 can be used to store an additional backboard assembly. The second shelf 320 can be vertically adjusted similarly to what is already described with the shelf 252. Optionally, the second shelf 320 can be vertically adjusted by a pin-in-hole coupling 322. The second shelf 320 can include a base member 324 that engages the first upright member 224B. The base member 324 may be tubing that is sized to fit around the first upright member 224B. Optionally, the base member 324 may be a channel that surrounds the first upright member 224B, as shown in FIG. 10. One side 326A, or two sides 326A, 326B oppositely disposed, of the base member 324 of the second shelf 320 can include a hole 328 extending through the wall of the base member 324. Through this hole(s) 328, a pin 330 having a cross-sectional area slightly less than the hole(s) 328 is inserted therethrough in order for the pin 330 to slide through the hole(s) 328 into the aligned hole(s) 238 of the first upright member 224B of the frame 210. The pin 330 can lock the base member 324 of the second shelf 320 into place to prevent sliding. It is appreciated that one of ordinary skill in the art could include the second shelf 320 on at least one of the front side 232, the rear side 234, and the lateral sides 228A, 228B. Other embodiments can include at least one of the carrier unit 250A, the carrier unit 250B, and the second shelf 320 on at least one of the front side 232, the rear side 234, and the lateral sides 228A, 228B.

A method of using the storage cart 200 and operating the storage cart 200 during replacement of the backboard assembly 14 is also provided. With reference to all of the Figures, the backboard assembly 14 coupled to the basketball goal support assembly 16 of the basketball goal system 8 is lowered similar to a position shown in FIG. 1. Typically, this can be accomplished by removing a locking pin connected at the hydraulic portable backstop 2 and pulling back a supporting member 3, thereby rotating the supporting member 3 about a pivot point. Once the trapezoidal extension arm 4 is lowered, a safety mechanism, such as a pin, is used to lock the position of the basketball goal support assembly 16. Other methods and systems may be employed to lower the backboard assembly 14.

Figure 11A:
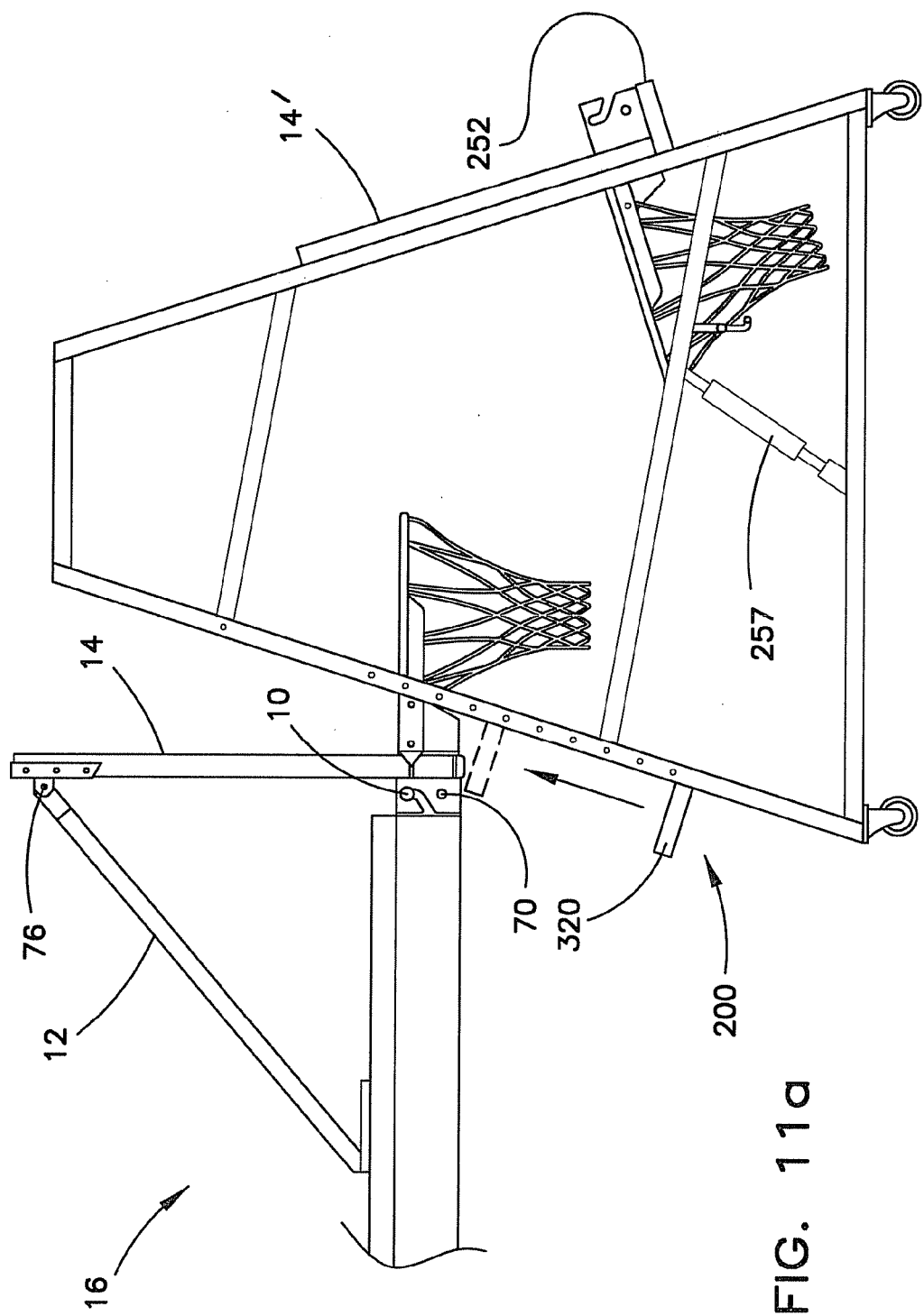
FIG. 11a is side view of the storage cart within proximity of the basketball goal assembly depicting using the storage cart.
Figure 11B:
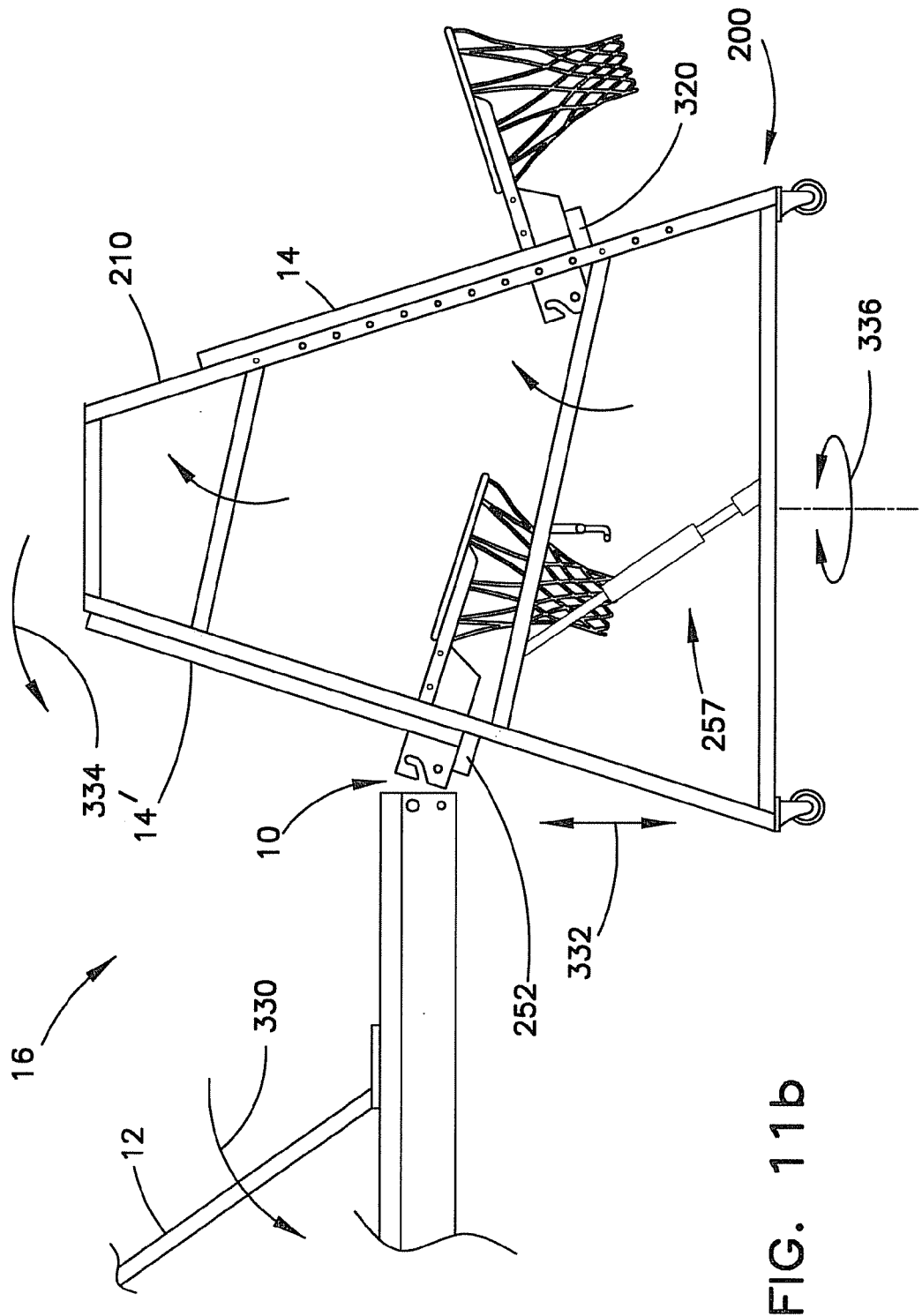
FIG. 11b is side view of the storage cart within proximity of the basketball goal assembly depicting using the storage cart.

According to one embodiment, the storage cart 200 can be moved toward the basketball goal support assembly 16 and put in a position adjacent to the basketball goal support assembly 16, as shown in FIG. 11a. The shelf 320 can then be moved to engage the backboard assembly 14, with the new position represented by the dashed shelf in FIG. 11a. The first backboard assembly 14 can be removed similarly to what is described in relation to the quick change bracket backboard system 10, as described above. For example, the pin 76 can be removed from each corner bracket of the backboard assembly 14, allowing the bracing means 12 to be removed from the backboard assembly 14. The bracing means 12 is rotated away, represented by arrow 330, from the backboard assembly 14, as shown in FIG. 11b. The connecting pin 70 can also be removed from each opening and each second aperture of the first and second yoke members, respectively. The backboard assembly 14 can then be raised to urge the slots of the first yoke member from the coupling shaft of the second yoke member, or vice versa. Once the slots are decoupled from the coupling shaft, the backboard assembly 14 can be rotated about the contacting point between the base of the backboard assembly 14 and the shelf 320 toward the storage cart 200. Because of the tapered configuration of the storage cart 200, the backboard assembly 14 is permitted to lean securably against the frame 210, with the rim assembly disposed inside of the storage cart. Usually a backboard assembly with a shattered backboard can be lifted by one or more persons and placed on the shelf 320. The backboard assembly 14 can then be examined and/or repaired while on the storage cart 200. Alternatively, the backboard assembly 14 can be moved away to a place where maintenance can occur. In storage, the shelf 252 may be positioned to accommodate two rim assemblies that are disposed toward the inside of the storage cart.

In FIGS. 11a-11b, a new replacement backboard assembly 14' is stored and/or placed on the shelf 252. The original backboard assembly 14 can remain on the second shelf 320 or be removed entirely therefrom. FIG. 11b illustrates the backboard assembly 14 in a position where the rim assembly extends outward away from the storage cart. This type of position may require additional securable members such as clamps, ropes, tape, wire, adjustable locking straps, or the like. It may be desirable to position the rim assembly toward the inside of the storage cart in order to shift the center of gravity inward and to permit better maneuverability while being moved, especially through doors. The storage cart 200 is then rotated in either direction, represented by arrow 336, in order for the new replacement backboard assembly 14' to be put in a position to be coupled to the basketball goal support assembly 16. The shelf 252 can be raised by the lifting mechanism 257 to adjust the vertical position of shelf 252, represented by arrow 332, such that the backboard assembly 14' is put adjacent to a portion of the quick change bracket backboard system 10.

The steps described above in relation to the removal of the backboard assembly 14, as described herein, can be reversed in order for the new replacement backboard assembly 14' to be coupled to the basketball goal support assembly 16. For example, the backboard assembly 14' can be lowered to urge the slots of the first yoke member to couple with the shaft of the second yoke member. Once the replacement backboard assembly is coupled to the basketball goal, the storage cart can then be removed from the location and returned to storage. The basketball goal system is then returned to its operable position. Accordingly, instead of replacing a basketball goal system with a new one basketball goal system, the basketball goal of the instant basketball goal system is quickly replaced. Various combinations described herein, and methods of use thereof, are within the scope of the present invention as appreciated by one of ordinary skill in the art. For example, various embodiments of the storage cart can include one or various combinations of the carrier unit 250B with the lifting mechanism 257' on the any side; the carrier unit 250A with the lifting mechanism 257 on any side; and/or the second shelf 320 on any side.

It is therefore intended that the foregoing detailed description be regarded as illustrative rather than limiting, and that it be understood that it is the following claims, including all equivalents, that are intended to define the spirit and scope of this invention.

What is claimed is:

1. A backboard replacement system for replacing a backboard installed on a basketball goal support of a basketball goal system, the system comprising:
    a quick change backboard bracket system including a first yoke member having a central plate coupled to a backboard and a left web and a right web fixed to the central plate, each of the left and right webs extending outwardly and having a slot, a second yoke member having a middle plate coupled to a basketball goal support, a left arm and a right arm fixed to the middle plate extending outwardly and having a first aperture, and a coupling shaft being dimensioned to fit within, and positioned through, each first aperture of the second yoke member and being dimensioned to engage each slot of the first yoke member; and
    a storage cart having a frame including a top and a base, and a plurality of upright support members interconnecting the base and the top, a carrier unit attached to the frame and including a shelf sized to support the backboard, and a lifting mechanism attached to the frame and to the carrier unit and configured to adjust the vertical position of the shelf, wherein upon suitable adjustment of the shelf the first and second yoke members of the quick change backboard bracket system are respectively coupled or decoupled.

2. The backboard replacement system of claim 1, wherein the base has a depth that is greater than a depth of the top to form a taper sized to permit the backboard to lean securably against the frame of the storage cart.

3. The backboard replacement system of claim 1 further comprising a plurality of wheels to permit movement of the storage cart proximate said backboard, the wheels attached to the base of the frame.

4. The backboard replacement system of claim 3, wherein the frame supporting the backboard is sized to fit within one of a width of a standard door of about 0.91 m (36 inches) and a height of a standard door of about 2.03 m (80 inches).

5. The backboard replacement system of claim 1, wherein the carrier unit further comprises at least one pair of cross members positioned at lateral sides of the frame, each cross member having a first end pivotably connected to the frame and a second end attached to the shelf, wherein the lifting mechanism is configured to urge each cross member to pivot about the first end such that the vertical position of the shelf is adjusted.

6. The backboard replacement system of claim 5, wherein the carrier unit further comprises at least one lateral member connecting the at least one pair of cross members positioned at opposite lateral sides of the frame, and the lifting mechanism is attached to the at least one lateral member.

7. The backboard replacement system of claim 1, wherein the lifting mechanism comprises a lift jack and a manual crank connected thereto, the manual crank being configured to adjust the vertical position of a movable member of the lift jack.

8. The backboard replacement system of claim 1, wherein the shelf is a first shelf, and said storage cart further comprises a second shelf positioned at the opposite side of the frame as the first shelf and coupled to the frame, wherein the second shelf is vertically adjustable.

9. The backboard replacement system of claim 1, wherein each web of the central plate of the first yoke member further comprises an opening and the second yoke member further comprises a second aperture in each of the left and right arms, the system further comprising a removable connecting pin being dimensioned to engage each opening of the first yoke member and each second aperture of the second yoke member.

10. The backboard replacement system of claim 9, wherein the lifting mechanism of the storage cart is configured to urge the slot of the first yoke member to engage or disengage respectively from the coupling shaft of the second yoke member after removal of the connecting pin.

11. The backboard replacement system of claim 1, wherein the quick change backboard bracket system further comprises a bracing means coupled to the basketball goal support and removably attached to the backboard.

12. A basketball backboard replacement system for replacing a backboard installed on a basketball goal support of a basketball goal system, the system comprising:
a quick change backboard bracket system including a first yoke member having a slot formed therein, and a second yoke member having a coupling shaft, where the first yoke member is coupled to one of the backboard or the basketball goal support and the second yoke member is coupled to the other, where the backboard and the basketball goal support are capable of being coupled to one another by insertion of the coupling shaft into the slot, and being decoupled from one another by removal of the coupling shaft from the slot; and
a storage cart including a frame having a top and a bottom, and a pair of upright support members interconnected to the base and the top, a carrier unit pivotably attached to the frame and including a shelf sized to support said backboard, and a lifting mechanism attached between the frame and the carrier unit, the lifting mechanism configured to adjust the vertical position of the shelf so that the vertical position of the backboard is adjustable for insertion or removal of the coupling shaft relative to the slot respectively to couple or decouple the backboard and the basketball goal support.

13. The backboard replacement system of claim 12, wherein the base has a depth that is greater than a depth of the top so that the frame has a taper sized to permit the backboard to lean securably against the frame of the storage cart.

14. The backboard replacement system of claim 12 further comprising a plurality of wheels to permit movement of the storage cart proximate said backboard, the wheels attached to the base of the frame.

15. The backboard replacement system of claim 12, wherein the slot of the first yoke member comprises a vertical portion.

16. The backboard replacement system of claim 12, wherein the carrier unit is disposed along a front side of the storage cart, the system further comprising a second shelf coupled to the frame and disposed along a rear side of the frame, opposite the front side.

17. The backboard replacement system of claim 16, wherein the second shelf is vertically adjustable.

18. The backboard replacement system of claim 12, wherein the carrier unit further comprises at least one pair of cross members positioned proximate the upright support members of the frame, each cross member having a first end pivotably connected to the frame and a second end attached to the shelf, wherein the lifting mechanism is configured to urge each cross member to pivot about the first end such that the vertical position of the shelf is adjusted.

19. The backboard replacement system of claim 12, wherein the carrier unit further comprises at least one lateral member interconnected to the at least one pair of cross members, and a portion of the lifting mechanism is attached to the at least one lateral member.

20. The backboard replacement system of claim 19, wherein the lifting mechanism comprises a lift jack and a manual crank connected thereto and accessible from a lateral side of the frame, the manual crank being configured to adjust the vertical position of a movable member of the lift jack.

21. The backboard replacement system of claim 12, wherein each of the first yoke member and the second yoke member has an opening, where, when the opening of the first yoke member is aligned with the opening of the second yoke member, a connecting pin is insertable through each of the openings to further couple the backboard and the basketball goal support.

22. The backboard replacement system of claim 12, wherein the basketball goal support further includes a bracing member, the bracing member removably attached to backboard.

23. A basketball backboard replacement system comprising:
a backboard including a first yoke member having a slot formed therein, and a collapsible basketball goal support having a second yoke member having a coupling shaft, where the backboard and the basketball goal support are capable of being coupled to one another by insertion of the coupling shaft into the slot, and being decoupled from one another by removal of the coupling shaft from the slot; and
a storage cart including a frame having a top and a bottom, and a pair of upright support members interconnected to the base and the top, a carrier unit pivotably attached to the frame and including a first shelf disposed at a front side of the frame to support said backboard, a second shelf coupled to the frame and disposed at a rear side of the frame, opposite the front side, the second shelf being vertically adjustable, and a lifting mechanism attached between the frame and the carrier unit, the lifting mechanism configured to adjust the vertical position of the first shelf so that the vertical position of the backboard is adjustable for insertion or removal of the coupling shaft relative to the slot respectively to couple or decouple the backboard and the basketball goal support.

24. The backboard replacement system of claim 23, wherein the base has a depth that is greater than a depth of the top so that the frame has a taper sized to permit the backboard on the at least one of the first shelf and the second shelf to lean securably against the frame.

25. The backboard replacement system of claim 24, wherein each of the first yoke member and the second yoke member has an opening, where, when the opening of the first yoke member is aligned with the opening of the second yoke member, a removable connecting pin is insertable through each of the openings to further couple the backboard and the basketball goal support.

\* \* \* \* \*